US009542742B2

(12) United States Patent
Tošić et al.

(10) Patent No.: US 9,542,742 B2
(45) Date of Patent: Jan. 10, 2017

(54) ESTIMATION OF THE SYSTEM TRANSFER FUNCTION FOR CERTAIN LINEAR SYSTEMS

(71) Applicants: Ivana Tošić, Berkeley, CA (US); Jae Young Park, Houston, TX (US); Kathrin Berkner, Los Altos, CA (US)

(72) Inventors: Ivana Tošić, Berkeley, CA (US); Jae Young Park, Houston, TX (US); Kathrin Berkner, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 236 days.

(21) Appl. No.: 14/168,832

(22) Filed: Jan. 30, 2014

(65) Prior Publication Data

US 2015/0215604 A1 Jul. 30, 2015

(51) Int. Cl.
*H04N 13/02* (2006.01)
*G06T 7/00* (2006.01)
*H04N 17/00* (2006.01)

(52) U.S. Cl.
CPC ............. *G06T 7/002* (2013.01); *G06T 7/0018* (2013.01); *H04N 13/0232* (2013.01); *H04N 17/002* (2013.01)

(58) Field of Classification Search
CPC ............. B60W 2040/0881; B60W 2050/0062; B60W 2050/0083; B60W 2530/14; B60W 2540/30; B60W 2550/308; B60W 2550/402; B60W 30/143; B60W 30/16; B60W 40/09; B60W 50/0098; B60W 50/085; G06T 7/002; G07C 5/0841; H04N 13/0232

USPC ............................................. 348/77
See application file for complete search history.

(56) References Cited

U.S. PATENT DOCUMENTS

| | | | |
|---|---|---|---|
| 8,761,534 B2 | 6/2014 | Shroff et al. | |
| 8,824,779 B1* | 9/2014 | Smyth | G06K 9/0061 382/100 |
| 9,185,272 B2* | 11/2015 | Ebe | H04N 5/217 |
| 9,288,389 B2* | 3/2016 | Shroff | H04N 5/2254 |
| 9,307,146 B2* | 4/2016 | Shroff | H04N 5/2254 |
| 9,392,153 B2* | 7/2016 | Myhre | H04N 5/2254 |
| 2003/0202573 A1* | 10/2003 | Yamaguchi et al. | 375/226 |
| 2004/0145810 A1* | 7/2004 | Ranalli | 359/569 |
| 2005/0141649 A1* | 6/2005 | Tanabe | 375/340 |
| 2011/0161059 A1 | 6/2011 | Jain et al. | |
| 2012/0062760 A1* | 3/2012 | Klapp et al. | 348/222.1 |
| 2013/0113981 A1 | 5/2013 | Knight et al. | |
| 2013/0127901 A1 | 5/2013 | Georgiev et al. | |
| 2013/0215236 A1* | 8/2013 | Shroff et al. | 348/49 |
| 2013/0216123 A1* | 8/2013 | Shroff et al. | 382/154 |
| 2013/0216124 A1* | 8/2013 | Shroff et al. | 382/154 |

(Continued)

OTHER PUBLICATIONS

Biship et al, Light Fiedl Superresolution, 2009.*

(Continued)

*Primary Examiner* — Shan Elahi
(74) *Attorney, Agent, or Firm* — Fenwick & West LLP (57) ABSTRACT

The pupil image function (PIF) matrix of a plenoptic imaging system is calibrated, taking advantage of the low rank of the PIF matrix. In one approach, the low rank is utilized by identifying a subspace for the PIF matrix and then estimating the PIF matrix within that subspace. This can lead to a significant reduction in the number of calibration patterns used to estimate the PIF matrix.

19 Claims, 4 Drawing Sheets
(3 of 4 Drawing Sheet(s) Filed in Color)

(56) References Cited

U.S. PATENT DOCUMENTS

| | | | |
|---|---|---|---|
| 2013/0216125 A1* | 8/2013 | Shroff et al. | 382/154 |
| 2013/0235261 A1* | 9/2013 | Berkner | H04N 5/2254 348/374 |
| 2013/0300912 A1* | 11/2013 | Tosic | G06N 5/04 348/335 |
| 2014/0139705 A1* | 5/2014 | Ebe | H04N 5/217 348/234 |
| 2014/0241615 A1* | 8/2014 | Shroff et al. | 382/154 |
| 2015/0181091 A1* | 6/2015 | Myhre | H04N 5/2254 348/345 |

OTHER PUBLICATIONS

Broxton, M. et al., "Wave Optics Theory and 3-D Deconvolution for the Light Field Microscope," Optics Express, Oct. 21, 2013, pp. 25418-25439, vol. 21, No. 21.

Cai, J. et al., "A Singular Value Thresholding Algorithm for Matrix Completion," SIAM J. on Optimization, Mar. 2010, pp. 1956-1982, vol. 20, No. 4.

Candes, E. J. et al., "Decoding by Linear Programming," IEEE Transactions on Information Theory, Dec. 2005, pp. 4203-4215, vol. 51, No. 12.

Davis, C. et al., "The Rotation of Eigenvectors by a Perturbation, III," SIAM J. Numer. Anal., Mar. 1970, pp. 1-46, vol. 7.

Delbracio, M. et al., "The Non-Parametric Sub-Pixel Local Point Spread Function Estimation Is a Well Posed Problem," International Journal of Computer Vision, Jun. 2011, pp. 175-194, vol. 96, No. 2.

Donoho, D. L., "Compressed Sensing," IEEE Transactions on Information Theory, Apr. 2006, pp. 1289-1306, vol. 52, No. 4.

Eftekhari, A. et al., "The Restricted Isometry Property for Random Block Diagonal Matrices," Applied and Computational Harmonic Analysis, 2015, pp. 1-31, vol. 38.

Lee, K. et al., "ADMiRA: Atomic Decomposition for Minimum Rank Approximation," IEEE Transactions on Information Theory, Sep. 2010, pp. 4402-4416, vol. 56, No. 9.

Needell, D. et al., "CoSaMP: Iterative Signal Recovery from Incomplete and Inaccurate Samples," Commun. ACM, Dec. 2010, pp. 93-100, vol. 53, No. 12.

Recht, B. et al., "Guaranteed Minimum-Rank Solutions of Linear Matrix Equations Via Nuclear Norm Minimization," SIAM Review, Sep. 2010, pp. 471-501, vol. 52, No. 3.

Shroff, S. A. et al., "Image Formation Analysis and High Resolution Image Reconstruction for Plenoptic Imaging Systems," Applied Optics, Apr. 1, 2013, pp. D22-D31, vol. 52, No. 10.

Tosic, I. et al., Dictionary Learning for Incoherent Sampling with Applications to Plenoptic Imaging, IEEE International Conference on Acoustics, Speech, and Signal Processing (ICASSP), 2013, 5 pages.

Waters, A. E. et al., "SpaRCS: Recovering Low-Rank and Sparse Matrices from Compressive Measurements," in Advances in Neural Information Processing Systems, 2011, pp. 1089-1097.

Wedin, P., "Perturbation Bounds in Connection with Singular Value Decomposition," BIT Numerical Mathematics, 1972, pp. 99-111, vol. 12, No. 1.

Yuan, M. et al., "Dimension Reduction and Coefficient Estimation in Multivariate Linear Regression," Journal of the Royal Statistical Society: Series B (Statistical Methodology), 2007, pp. 329-346, vol. 69, No. 3.

\* cited by examiner

ESTIMATION OF THE SYSTEM TRANSFER FUNCTION FOR CERTAIN LINEAR SYSTEMS

BACKGROUND OF THE INVENTION

1. Field of the Invention

This invention relates generally to the estimation of the system transfer function for certain linear systems, for example the estimation of the pupil image function matrix for plenoptic imaging systems.

2. Description of the Related Art

As an example of one class of systems, the plenoptic imaging system has recently received increased attention. It can be used to recalculate a different focus point or point of view of an object, based on digital processing of the captured plenoptic image. The plenoptic imaging system also finds application in multi-modal imaging, using a multi-modal filter array in the plane of the pupil aperture. Each filter is imaged at the sensor, effectively producing a multiplexed image of the object for each imaging modality at the filter plane. Other applications for plenoptic imaging systems include varying depth of field imaging and high dynamic range imaging.

Many of these applications depend strongly on an accurate characterization of the plenoptic imaging system. This is especially true for applications that utilize more advanced image processing, such as deconvolution and super-resolution. For example, if the point response of a plenoptic imaging system can be accurately estimated, then an inverse problem can be solved to obtain higher resolution images from the captured plenoptic images.

The behavior of a plenoptic imaging system can be calculated based on the design data for the system. However, the physical system will deviate from the design data and even small deviations can affect the overall performance of the system. For example, the use of micro-elements, such as microlens arrays, increases the sensitivity to deviations and imposes a stricter requirement on the characterization of the plenoptic imaging system. Thus, calibration of physical systems, rather than modeling based on design data, is desirable in certain situations.

The point response for a plenoptic imaging system will be referred to as the "pupil image function" (PIF) of the plenoptic imaging system, as described in more detail below. Unlike conventional optical imaging systems, the PIF for a plenoptic imaging system is strongly spatially variant. Therefore, the PIF cannot be estimated for only a single field point, with the assumption that the PIF will then be the same or similar for all other field points. Rather, the PIF preferably is estimated over the entire field of view of the plenoptic imaging system. In one approach, a point source object is physically translated across the entire field of view, and the system's response is observed separately at each field point. The PIF is then assembled from the observed images. However, this approach is very time consuming.

Thus, there is a need for better methods for estimating the PIF of a plenoptic imaging system and, more generally, for estimating the system transfer function for a certain class of linear systems.

SUMMARY

The present invention overcomes the limitations of the prior art by taking advantage of the low rank property of the PIF matrix. In one approach, the low rank is used advantageously by identifying a subspace for the PIF matrix and then estimating the PIF matrix within that subspace. This can lead to a significant reduction in the number of objects (e.g., calibration patterns) used to estimate the PIF matrix.

One aspect concerns producing an estimate $\hat{A}$ of the PIF matrix A for a plenoptic imaging system. The plenoptic imaging system can be characterized by $y=Ax+e$, where x is an object, e is noise and y is the plenoptic image resulting from object x. A set of calibration objects X is selected and applied to the plenoptic imaging system. The resulting plenoptic images Y are observed. The PIF estimate $\hat{A}$ is calculated from the plenoptic images Y and calibration objects X, taking advantage of the fact that A has low rank. In one approach, a subspace of A is identified and then $\hat{A}$ is estimated within the subspace. For example, the subspace may be identified based on the assumption that colspan(A)=rowspan(A).

A specific implementation is based on the singular value decomposition (SVD) of Y. Let SVD(Y)=(WΛZ). Then, in one approach $\hat{A}=Y(\hat{V}^T X)^\dagger \hat{V}^T$, where $\hat{V}=W(:,1:\hat{k})$ and $\hat{k}$ is greater than or equal to the rank of A. Preferably, $\hat{k}$ is an estimate of the rank of A. Furthermore, the calibration objects X are selected as random calibration patterns, such as Gaussian or Bernoulli independent and identically distributed (i.i.d.) calibration patterns. This approach can be computationally efficient and reduce the number of calibration objects in X.

A similar approach can be applied to other linear systems that have a system transfer matrix with similar characteristics, for example if colspan(A)=rowspan(A).

Other aspects of the invention include methods, devices, systems, software, improvements, components, applications and other aspects related to the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. Consider first the plenoptic imaging system as an example.

Sample Configuration.

Figure 1:
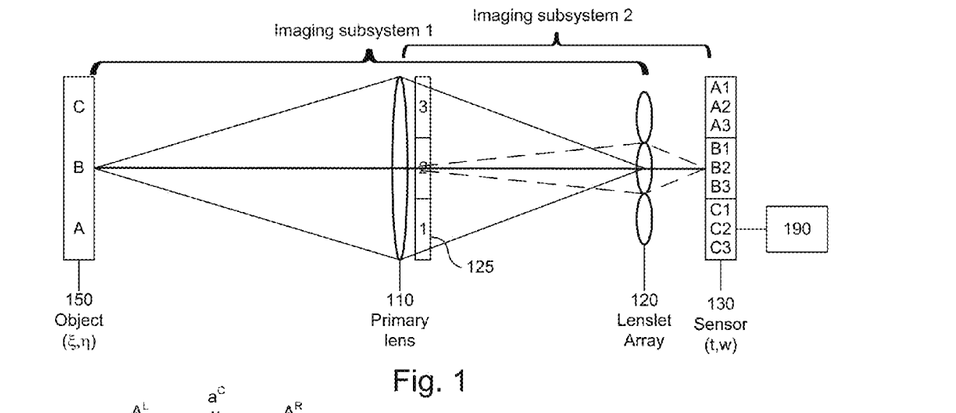
FIG. 1 is a simplified diagram of a plenoptic imaging system.

FIG. 1 is a simplified diagram of a plenoptic imaging system. The system includes a primary imaging subsystem 110 (represented by a single lens in FIG. 1), a secondary imaging array 120 (represented by a lenslet array) and a sensor array 130. These form two overlapping imaging subsystems, referred to as subsystem 1 and subsystem 2 in FIG. 1. The plenoptic imaging system optionally may have a filter module 125 positioned at a location conjugate to the sensor array 130. The filter module contains a number of spatially multiplexed filter cells. For example, the filter cells could correspond to different modalities within the object.

The spatial coordinates (ξ,η) will be used at the object plane and (t, w) at the sensor plane. Note that the different components do not have to be designed exactly as shown in FIG. 1. For example, the "primary lens" could be various combinations of elements, including lenses, mirrors and combinations of the two. Similarly, the secondary imaging array could be a pinhole array, or a reflective array.

Ignoring the filter module 125 for the moment, in imaging subsystem 1, the object 150 is imaged by the primary lens 110 to produce an image that will be referred to as the "primary image." This primary lens 110 may be a camera imaging lens, microscope objective lens or any other such imaging system. The lenslet array 120 is placed approximately at the location of the primary image. Each lenslet then images the pupil of the primary lens to the sensor plane. This is imaging subsystem 2, which partially overlaps with imaging subsystem 1. The "image" created at the sensor array 130 will be referred to as the "plenoptic image" in order to avoid confusion with the "primary image."

The plenoptic image can be divided into an array of subimages, corresponding to each of the lenslets. Note, however, that the subimages are images of the pupil of imaging subsystem 1, and not of the object 150. In FIG. 1, the plenoptic image and subimages are labeled A1-C3. A1 generally corresponds to portion A of the object 150 as filtered by filter cell 1 in the filter module 125, A2 corresponds to portion B of the object 150, as filtered by filter cell 2, and so on. The plenoptic image (composed of subimages) can be processed by a processing module 190 to reconstruct various images of the object. The processing could be deinterleaving and demultiplexing. It could also include more sophisticated image processing.

The plenoptic imaging system can be modeled by $$\begin{bmatrix} I_f^{1,1} \\ I_f^{1,2} \\ \cdots \\ \cdots \\ I_f^{1,W} \\ I_f^{2,1} \\ \cdots \\ \cdots \\ I_f^{T,W} \end{bmatrix} = \begin{bmatrix} PIF_{1,1}^{1,1} & PIF_{1,2}^{1,1} & \cdots & \cdots & PIF_{M,N}^{1,1} \\ PIF_{1,1}^{1,2} & PIF_{1,2}^{1,2} & \cdots & \cdots & PIF_{M,N}^{1,2} \\ \cdots & \cdots & \cdots & \cdots & \cdots \\ \cdots & \cdots & \cdots & \cdots & \cdots \\ PIF_{1,1}^{1,W} & PIF_{1,2}^{1,W} & \cdots & \cdots & PIF_{M,N}^{1,W} \\ PIF_{1,1}^{2,1} & PIF_{1,2}^{2,1} & \cdots & \cdots & PIF_{M,N}^{2,1} \\ \cdots & \cdots & \cdots & \cdots & \cdots \\ \cdots & \cdots & \cdots & \cdots & \cdots \\ PIF_{1,1}^{T,W} & PIF_{1,2}^{T,W} & \cdots & \cdots & PIF_{M,N}^{T,W} \end{bmatrix} \begin{bmatrix} I_{o,1,1} \\ I_{o,1,2} \\ \cdots \\ \cdots \\ I_{o,2,1} \\ I_{o,2,2} \\ \cdots \\ \cdots \\ I_{o,M,N} \end{bmatrix} \quad (1A)$$

where $I_f^{T,W}$ is the intensity at sensor element T,W; $I_{o,M,N}$ is the intensity from object element M,N; and $PIF_{M,N}^{T,W}$ is the plenoptic imaging system response, which we refer to as the pupil image function or PIF. T,W is the discretized version of sensor coordinates (t,w) and M,N is the discretized version of object coordinates (ξ,η). Eq. 1A can be written more compactly as $$y = Ax + e, \quad (1B)$$

where x is the vectorized object $I_o$, y is the vectorized plenoptic image $I_f$, e is noise, and A is the two-dimensional PIF matrix.

In the following, we address the calibration problem, namely the estimation of the PIF matrix A. We denote the ground truth PIF matrix as an N×N matrix A. To estimate A, we begin by choosing a set of calibration patterns as objects. Each calibration pattern, which itself is a vectorized object, is denoted as $x_i \in \mathbb{R}^N$. We denote the number of calibration patterns as m, and denote the N×m matrix formed by stacking the $x_i$ into a matrix as $X = [x_1, \ldots, x_m]$. Given these calibration patterns X, the corresponding observations Y are obtained by $$Y = AX + E, \quad (2)$$

where E is an N×m matrix representing noise. The goal of the calibration process is to estimate A from the calibration patterns X and the corresponding plenoptic images Y. In a brute force approach, N calibration patterns can be used to estimate the PIF matrix A.

As described in the following sections, the underlying PIF matrix A exhibits a low-rank structure. Additionally, the column span of A coincides with the row span of A. We can use these properties to accurately estimate A using a reduced number m of calibration patterns. In general, it is desirable to reduce m as this will allow us to reduce the calibration time.

Properties of PIF Matrix A

Figure 2A:
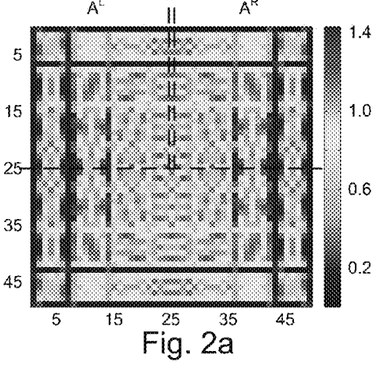
FIG. 2a is a representation of a 49×49 PIF matrix.

First consider some of the relevant properties of A. To do so, we will make use of an example PIF matrix as shown in FIG. 2a. This particular matrix has dimensions 49×49 and has been simulated using the mathematical model of a plenoptic imaging system described in U.S. patent application Ser. No. 13/398,813, "Design and Optimization of Plenoptic Imaging Systems," which is incorporated by reference herein. See especially Appendix A of the foregoing. This PIF matrix is the system transfer matrix for a plenoptic imaging system with a main lens made of BK7 glass with an aperture diameter of 6 mm, F-number equal to 9, object distance 300 mm, distance between aperture and microlens array plane equal to 85.5 mm, and design wavelength of 588 nm. The microlens array is an array of equal microlenses made out of fused silica, each of diameter 55 micron, F-number 9, reference wavelength 588 nm.

Four Quadrant Symmetry.

FIG. 2a shows that there is symmetry in the PIF matrix. We let the top left corner to represent the coordinate (1,1) and the bottom right corner to represent (49,49). The matrix is symmetric about y=25 and about x=25, where x denotes columns and y denotes rows. Each of these symmetries has implications on the properties of A. First, the symmetry about y=25 implies that the top 24 rows of A are identical to the flipped/mirrored version of the bottom 24 rows of A or, formally, $A_{[i,:]} = A_{[49-i+1,:]}$ for i=1, . . . , 24. As a result, the measurements corresponding to the top 24 rows in A, i.e., $Y_{[1:24,:]}$, will be identical to those corresponding to the bottom 24 rows in A, i.e., $Y_{[26:49,:]}$, but in flipped/mirrored order, i.e. $Y_{[26:49,:]} = Y_{[24:1,:]}$. This also means that the rank of A can only be at most 25. Indeed, for this particular PIF matrix, the rank is exactly equal to 25, meaning that the top 25 rows are linearly independent of one another. Note that the choice of 25 linearly independent rows is not unique. For example, it could also be the bottom 25 rows.

To see how the symmetry about x=25 affects A, focus on the top half portion of A, and denote this matrix as $A^{top}$, i.e., $A^{top} = A_{[1:25,:]}$. Let us further divide $A^{top}$ into three portions: $A^{top} = [A^L \ a^C \ A^R]$ as shown by the dashed lines in FIG. 2a. Formally, $A^L = A_{[1:25,1:24]}$ is a 25×24 matrix containing the left half portion of $A^{top}$, $a^C = A_{[1:25,25]}$ is a 25×1 column vector that represents the central vertical axis of $A^{top}$, and $A^R = A_{[1:25,26:49]}$ is a 25×24 matrix containing the right half portion of $A^{top}$. Note again that due to the symmetry about x=25 we have that $A_{[:,i]}^L = A_{[:,49-i-1]}^R$ for i=1, . . . ,24. See Appendix A for a formal proof of symmetry.

rowspan(A)=colspan(A).

Another property of A is that the column span of A (denoted as colspan(A)) coincides with the row span of A (denoted as rowspan(A)). Formally, this property means that when writing the singular value decomposition (SVD) of A as $A = U\Sigma V^T$ and assuming that the singular values are ordered such that $\sigma_1 \geq \ldots \geq \sigma_{49}$, we will find that the matrix $$U^T V = \begin{bmatrix} U_{[:,1:25]}^T V_{[:,1:25]} & 0 \\ 0 & U_{[:,26:49]}^T V_{[:,26:49]} \end{bmatrix} \quad (3)$$

is block diagonal.

Figure 2B:
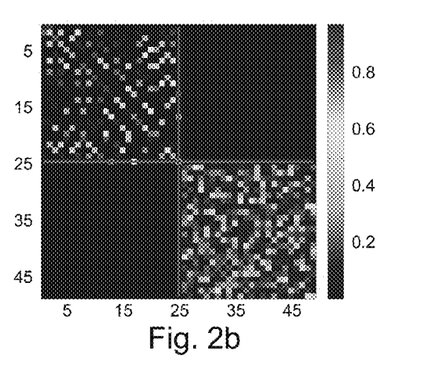
FIG. 2b is a representation of the $U^T V$ matrix for the PIF matrix of FIG. 2a, where U and V are respectively matrices of left and right singular vectors of the PIF matrix A.

FIG. 2b shows abs($U^T V$) for the simulated 49×49 PIF matrix of FIG. 2a. The red lines correspond to x=25 and y=25. Note that both $U_{[:,1:25]}^T V_{[:,1:25]}$ and $U_{[:,26:49]}^T V_{[:,26:49]}$ are non-zero blocks of matrices, and both off-diagonal blocks of entries are equal to zero. The first 25 vectors in U are the basis vectors that span the column space of A and the first 25 vectors in V are those that span the row space of A. The fact that the space spanned by $U_{[:,1:25]}$ is orthogonal to the space spanned by $V_{[:,26:49]}$ means colspan $(U_{[:,1:25]}) \subseteq$ colspan $(V_{[:,1:25]})$. Similarly, the fact that the space spanned by $V_{[:,1:25]}$ is orthogonal to the space spanned by $U_{[:,26:49]}$ means that colspan $(V_{[:,1:25]}) \subseteq$ colspan $(U_{[:,1:25]})$. Combining these two, we can infer that rowspan(A)=colspan($V_{[:,1:25]}$)=colspan($U_{[:,1:25]}$)=colspan(A) (4)

This is an important property that can be used to advantage.

Generalization.

Figure 3A:
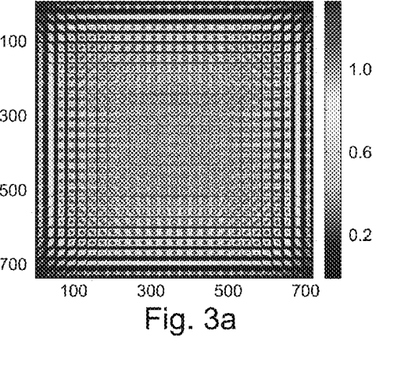
FIG. 3a is a representation of a 729×729 PIF matrix.

The properties of A described above are common among PIF matrices of systems with radial symmetry of the main lens and microlens imaging systems when the microlens system is positioned to image the pupil of the main lens. See Appendix A for a formal proof. For example, FIG. 3a is a representation of a PIF matrix of size 729×729. This larger PIF matrix has also been simulated with the same mathematical model used to simulate the smaller PIF matrix of FIG. 2, but uses a different sampling rate, which relates to a sensor with smaller pixel size. From FIG. 3a, it can be seen that the symmetry properties hold. The matrix is symmetric about x=365 and about y=365. Due to this symmetry, we expect the rank of this matrix to be no greater than 365. In fact, the numerical rank of this matrix is 245, which is less than 365.

Figure 3B:
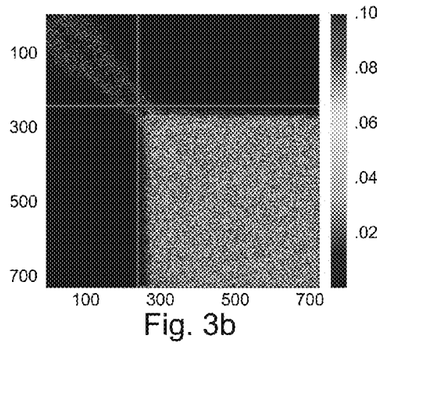
FIG. 3b is a representation of the $U^T V$ matrix for the PIF matrix of FIG. 3a, where U and V are respectively matrices of left and right singular vectors of the PIF matrix A.

In order to see whether or not the column span of A is equivalent to the row span of A, FIG. 3b shows the corresponding $U^T V$ matrix. The two lines 310x and 310y correspond to x=245 and y=245. Although there is not a strict block diagonal structure as in FIG. 2b, we can still see a strong resemblance to it. For example, we can see that most of the correlation between $U_{[:,1:245]}$ and V is contained within the correlation with $V_{[:,1:245]}$, and vice versa. We also see that the off-diagonal blocks are mostly zeros or near zero values indicating that $U_{[:,1:245]}$ is nearly orthogonal to $V_{[:,246:729]}$, and vice versa. Thus, the properties discussed for the 49×49 matrix should also hold, at least approximately, for this larger 729×729 PIF matrix. In fact, we have found that these properties generally hold for even larger matrices corresponding to higher sampled sensor planes.

In addition, the rank of the PIF matrices remains almost constant. For example, for a PIF matrix of size 2209×2209, we found that the rank of this matrix was only 256, which is only slightly higher than the rank of 245 for the 729×729 matrix. For a PIF matrix of size 4489×4489, we found that the rank was only 265. Therefore, if we are able to design an algorithm that requires a number m of calibration patterns that depends on the rank of the PIF matrix, we will be able to recover the underlying PIF matrix using far fewer calibration patterns than N.

Estimating the PIF Matrix

Figure 4:
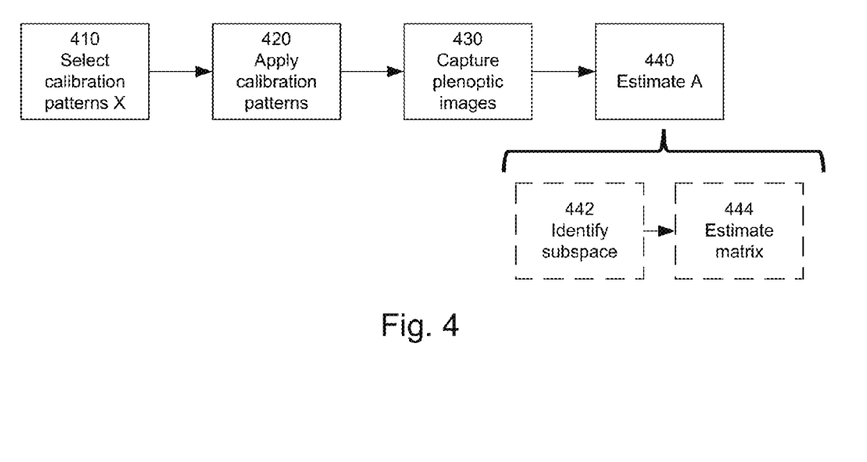
FIG. 4 is a flow diagram of a method for estimating the PIF matrix.

In this section we present approaches to estimating the PIF matrix A. FIG. 4 is a flow diagram of a method for producing an estimate Â of the PIF matrix A. A set of calibration objects X is selected 410. The calibration objects X are applied 420 to the plenoptic imaging system. The resulting plenoptic images Y are observed 430. An estimate Â is then calculated 440 from the plenoptic images Y and calibration objects X. The calculation 440 takes advantage of the fact that A has low rank and that rowspan(A)=colspan(A). In a particular implementation, the calculation 440 identifies 442 a subspace for A and then estimates 444 Â within that subspace.

Noiseless Case.

First consider the noiseless case such that we have Y=AX. For this example, use the 49×49 PIF matrix of FIG. 2. The subspace that we are interested in is the row span of A. In the noiseless case we have that:

$$Y = AX = U_{[:,1:25]} \Sigma_{[1:25,1:25]} V_{[:,1:25]}^T X \quad (5)$$

Let us assume for now that we know $V_{[:,1:25]}$ and that X is full rank. Then we can recover A as:

$$\hat{A} = Y(V_{[:,1:25]}^T X)^\dagger V_{[:,1:25]}^T \quad (6)$$

where the hat denotes that it is an estimate. When m>25 the recovery is exact.

However, the approach described above requires that we know V, which is a k×N matrix where the rows of $V^T$ span the row space of A. Note that the choice of V is not unique. In fact we may choose any $\hat{V}$ which satisfies rowspan($\hat{V}^T$)=rowspan(A). To do this, we make use of the fact that rowspan(A)=colspan(A). This means that instead of attempting to acquire the row span of A directly, we may equivalently obtain $\hat{V}$ via the column span of A. The identification of the column span is a simpler problem as we have colspan(A)=colspan(Y). Overall we have, $$\text{colspan}(Y)=\text{colspan}(A)=\text{rowspan}(A) \quad (7)$$

This says we are able to infer the row span of A via the column span of Y. The task of computing the basis vectors that span the column space of Y can be achieved by computing the SVD of $Y=W\Lambda Z^T$ and setting $\hat{V}$ to be the largest k left singular vectors of Y, which means setting $\hat{V}$ to be the first k column vectors of W: $\hat{V}=W_{[:,1:\hat{k}]}$. Using these vectors we can follow the above discussion and project our measurements onto $\hat{V}^T X$. This is summarized in Table 1 shown below.

TABLE 1

Estimating PIF matrix A for the noiseless case

Input: Observations Y = AX, full-rank calibration matrix X with m ≥ k, rank parameter $\hat{k}$
Output: $\hat{A}$
Subspace identification (step 442): (W Λ Z) ← SVD(Y)
　　　　　　　　　　　　　　　　　$\hat{V}$ ← W(:,1:$\hat{k}$)
Matrix estimation (step 444): $\hat{A}$ ← Y ($\hat{V}^T$X)$^\dagger \hat{V}^T$, where ( )$^\dagger$ denotes the pseudo-inverse Note that we do not need to compute the estimates of the rows one by one. Instead, we are able to compute the estimate of the entire matrix A at once by multiplying the pseudo-inverse to the entire observation matrix Y. Also note that one input is the rank parameter $\hat{k}$. That parameter can be estimated when the lens files for the plenoptic imaging system is available through simulation of the system matrix.

Noisy Case.

Now consider when there is noise in the measurements, i.e., Y=AX+E. Let us first see how the presence of noise affects the subspace identification step 442. Since there is added noise in the measurements, we will no longer have that colspan(Y)=colspan(A). However, according to the literature in perturbation theory, it is reasonable to believe that colspan(Y)≈colspan(A). Therefore, even in the presence of noise we will keep the subspace identification step 442 the same as the noiseless case.

Next, consider the matrix estimation step 444. The main objective of this step is to project the measurements onto the row space of $\hat{V}^T X$ while ensuring not to amplify noise. To do so it is important for the matrix of $\hat{V}^T X$ to have a "good" condition number, i.e., condition number close to 1. One way to ensure this is to populate X with random entries so that X satisfies the Restricted Isometry Property (RIP) for matrices and/or vectors. This property is a fundamental condition in the compressive sensing framework, and defined for matrices in B. Recht, M. Fazel, and P. A. Parrilo, "Guaranteed Minimum-Rank Solutions of Linear Matrix Equations via Nuclear Norm Minimization", *SIAM Rev.*, 52(3), 471-501. (31 pages), which is incorporated by reference. It has been shown that when the matrix X is populated with (i) i.i.d. Gaussian entries, i.e., $X_{ij}$~N(0,1/m) where N( ) is the normal distribution, or (ii) i.i.d symmetric Bernoulli entries taking ±sqrt(1/m) with probability ½, or (iii) i.i.d. random variables taking ±sqrt(3/m) with probability ⅙ and zero with probability ⅔; X will satisfy the RIP with high probability. Therefore, we can choose X populated with random entries chosen from any of these three distributions (i)-(iii). The RIP for vectors is an analog to the RIP for matrices. It has also been shown that the above three distributions (i)-(iii) also satisfy the RIP for vectors given sufficient number of measurements. In one approach, we keep the matrix estimation step 444 the same, but we use calibration patterns that are generated with Gaussian random variables.

Table 2 shows an estimation approach for the noisy case. Table 2 differs from Table 1 only in the selection of calibration objects. Note that the full-rank condition on X is not mentioned in Table 2, because a random Gaussian matrix will be full-rank with probability 1. Further note that the condition m≥k is the minimum number of measurements required so that the pseudo-inverse is invertible, and it does not guarantee the RIP of X.

TABLE 2

Estimating PIF matrix A for the noisy case

Input: Observations Y = AX + E, Gaussain calibration matrix X with m ≥ k, rank parameter $\hat{k}$
Output: $\hat{A}$
Subspace identification (step 442): (W Λ Z) ← SVD(Y)
　　　　　　　　　　　　　　　　　$\hat{V}$ ← W(:,1:$\hat{k}$)
Matrix estimation (step 444): $\hat{A}$ ← Y ($\hat{V}^T$X)$^\dagger \hat{V}^T$, where ( )$^\dagger$ denotes the pseudo-inverse In addition, we have observed that the number of calibration patterns should scale linearly with the rank of A, rather than linearly with N. The simulation results in the next section support this observation as we are able to obtain accurate estimates of A using a number m of calibration objects that is slightly higher than the rank of A and much smaller than N. Remembering the fact that the rank of A remains almost constant with increasing N, this implies that we are able to significantly save in the number of calibration patterns even when N gets very large.

Simulation Results

In this section we present simulation results to recover a 729×729 PIF matrix A (i.e. N=729) using random calibration patterns X. In the following simulations we populate X with Gaussian measurements where each entry in X follows $$\mathcal{N} = \left(0, \frac{1}{m}\right).$$

Then, we compute Y=AX+E. We compare the results from the approach shown in Table 2 to a low-rank recovery algorithm presented in M. Yuan, A. Ekici, Z. Lu and R. Monteiro, "Dimension reduction and coefficient estimation in multivariate linear regression," *Journal of the Royal Statistical Society: Series B (Statistical Methodology)*, vol. 69, no. 3, pp. 329-346, 2007. For a given noise level or SNR, we increase the number of calibration patterns m from 2 to 739 and for each m we run the two estimation approaches to recover A, given Y and X. Then, we compute the squared normalized distance between A and Â, i.e., $\|A-\hat{A}\|_F^2/N^2$.

The results are shown in FIG. 5. FIG. 5a is a plot of the result when there is no noise. FIGS. 5b-d plot the results when SNR=40 dB, SNR=20 dB, and SNR=10 dB, respectively. Plots 510a-d show the approach of Table 2. The alternate approach is shown by the slowly and steadily improving plot 520a-d. We can see that once we pass a certain value of m, the approach described above significantly outperforms the alternate approach. For each FIG. 5a-d, we can clearly see that when we have enough calibration patterns, our approach is able to accurately estimate A and significantly outperforms the low-rank minimization approach.

Figure 5A:
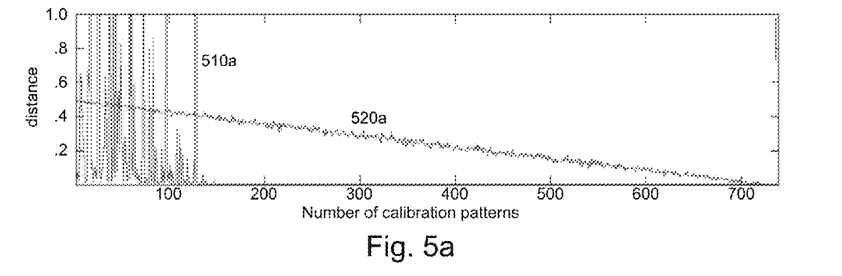
FIGS. 5a-d show simulation results for estimating a 729×729 PIF matrix using Gaussian calibration patterns.
Figure 5B:
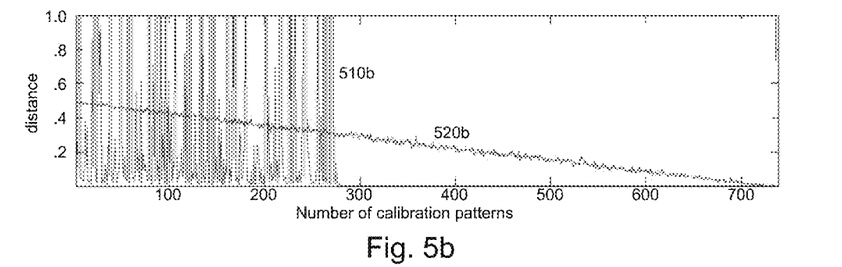
Figure 5C:
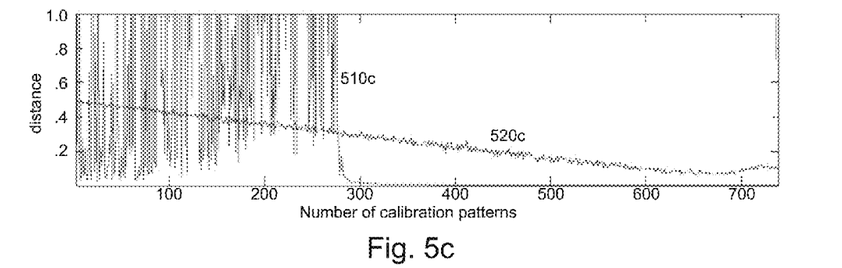
Figure 5D:
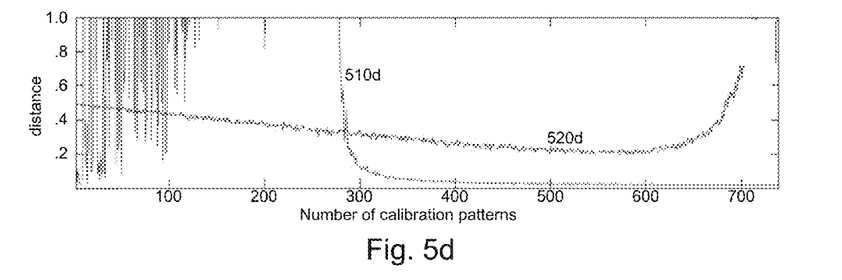

In FIG. 5a, once we have roughly 150 calibration patterns, our estimate is able to almost perfectly recover A. We require roughly more than m=150 to consistently identify the correct row space of A given Y. In the regime where m<150, we fail to consistently identify the correct subspace and thus we see high peaks in the plot. This trend is common across all four FIGS. 5a-d and for all results we can see that once we pass a certain number of m, we start to consistently identify the correct subspace and accurately recover A. Even in the worst cases, this value of m is only slightly higher than the rank of A, which is 245. Thus, all we needed was a mild over sampling factor to the rank of A for an accurate recovery.

The low-rank minimization approach, however, is not able to recover A as accurately as our approach, and we can see that the error of the approach decreases roughly linearly with m. Overall, we were able to decrease the number of calibration patterns significantly below N, while simultaneously producing accurate estimates of A.

FIGS. 6a-d show simulation results for estimating a 729×729 PIF matrix using a Gaussian calibration matrix versus a calibration matrix with condition number 1000. Each panel in FIG. 6 has two plots. Blue plots 610a-d are the result of using a Gaussian random matrix as the calibration matrix. Typically we expect Gaussian random matrices with entries that are independent and identically distributed (i.i.d.) to have condition numbers much smaller than 1000. Red plots 620a-d are the result of using a calibration matrix that has a condition number of 1000 for all values of m. These calibration matrices were generated by first creating a Gaussian random matrix and subsequently altering its singular values so that the ratio between the largest and the smallest singular value equals 1000. Using these two different calibration matrices, we compare the resulting estimate of A with varying amounts of noise.

Figure 6A:
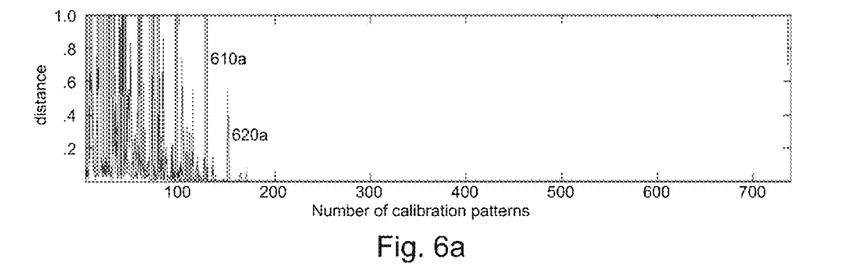
FIGS. 6a-d show simulation results for estimating a 729×729 PIF matrix using a Gaussian calibration matrix versus a calibration matrix with condition number 1000.
Figure 6B:
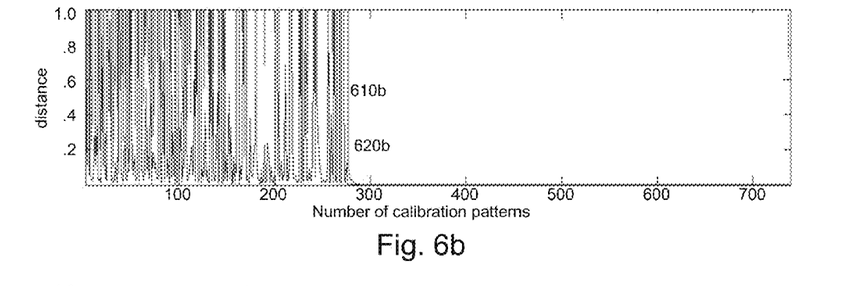
Figure 6C:
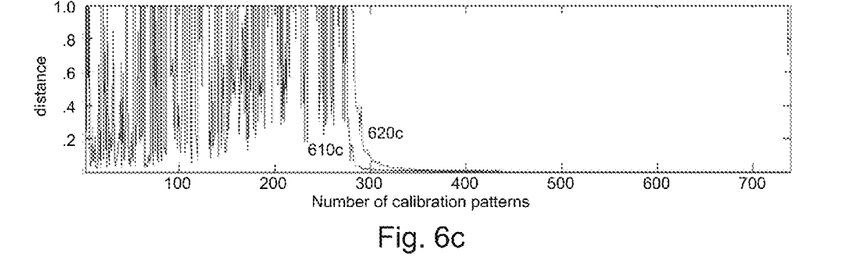
Figure 6D:
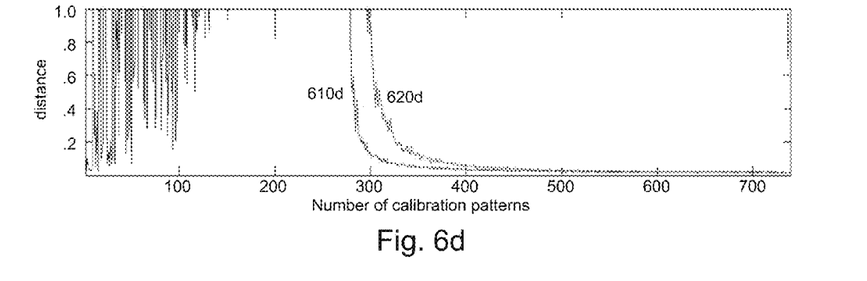

FIG. 6a shows the result when there is no noise in Y. There is no large difference in the results. This is expected as in the noiseless case we only require that X is full-rank with large enough m. Both matrices are full-rank and thus the results should not differ significantly. However, in the subsequent three FIGS. 6b-d, we can see that there is a substantial difference in the results. In all of these, we see that plots 620 struggle to obtain a comparable estimate to plots 610. This illustrates, at least numerically, that we desire calibration patterns that have good condition numbers and Gaussian matrices are reasonable choices.

Figure 7:
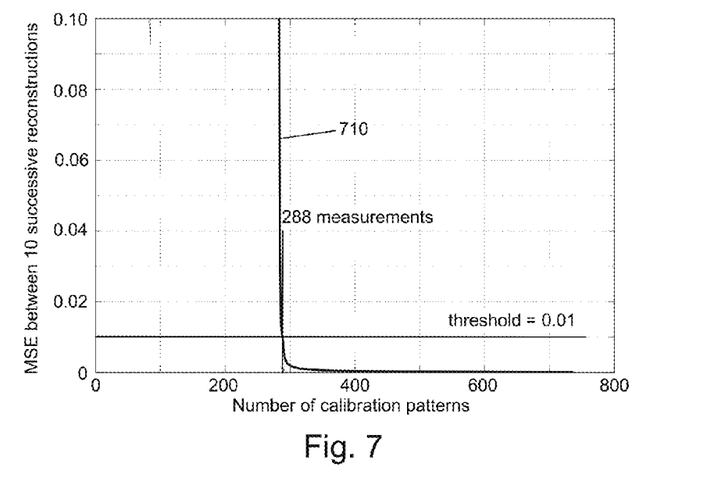
FIG. 7 plots mean square error of a PIF matrix estimate as a function of the number of calibration patterns.

FIG. 7 illustrates that we can dynamically estimate the number m of calibration objects needed for calibration, from data obtained during calibration. For example, by adding one measurement pattern in each iteration, we can check the convergence of the estimate for the PIF matrix. FIG. 7 plots the mean squared error (MSE) between two successive PIF estimates, averaged over a block of 10 successive iterations. We can see that the MSE 710 quickly drops at around 288 measurements, indicating that the PIF estimation has converged and that 288 patterns are sufficient. In one approach, the number of calibration patterns m is determined by when the MSE falls below a threshold (e.g., 0.01 in FIG. 7).

Although the detailed description contains many specifics, these should not be construed as limiting the scope of the invention but merely as illustrating different examples and aspects of the invention. It should be appreciated that the scope of the invention includes other embodiments not discussed in detail above. For example, other systems which have a transfer system matrix A with the properties shown in Eqn. (7) above (i.e., colspan(A)=rowspan(A)), can also be estimated using the approach described above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

APPENDIX A

Symmetry

The PIF function characterizes the propagation of light originating from an object point ($\xi$, i) through a plenoptic system onto a location (t, w) at the sensor plane. In one wave optics formulation, the PIF function is given by $$\mathcal{P}(t, w, \xi, \eta) = \left| \sum_\mu \sum_\nu \exp\left[\frac{jk}{2f_2}[(\mu D_2)^2 + (\nu D_2)^2]\right] \times \int\int P_2(u - \mu D_2, v - \nu D_2) \times \exp\left[\frac{jk}{2}\left(\frac{1}{z_2} + \frac{1}{z_3} - \frac{1}{f_2}\right)(u^2 + v^2)\right] \times \exp\left\{-jk\left[u\left(\frac{t}{z_3} - \frac{\mu D_2}{f_2}\right) + v\left(\frac{w}{z_3} - \frac{\nu D_2}{f_2}\right)\right]\right\} \times h_1(u - \xi, v - \eta) du dv \right|^2 \quad (8)$$

-continued $$h_1 = \mathcal{F}\left[P_1(x, y)\exp\left\{\frac{jk}{2}\left(\frac{1}{z_1} + \frac{1}{z_2} - \frac{1}{f_1}\right)(x^2 + y^2)\right\}\right] \quad (9)$$

where $\mathcal{F}[f]$ is the Fourier transform of the function $f$.

In the above equations, $P_1$ describes the pupil function of the main lens with focal length $f_1$, and $P_2$ is the pupil function of the microlens with diameter $D_2$ and focal length $f_2$. The object distance is $z_1$, the distance between the main lens and microlens plane is $z_2$, and the distance between the microlens plane and sensor plane is $z_3$. The parameter k denotes the wave number.

Assuming a circular aperture on the lenslet to eliminate crosstalk from light passing through neighboring lenslets, the PIF function for an on-axis lenslet (i.e. $\mu=0$, $v=0$) reduces to $$\mathcal{P}(t, w, \xi, \eta) = \left|\begin{array}{c} \int\int P_2(u, v) \times \exp \\ \left[\frac{jk}{2}\left(\frac{1}{z_2} + \frac{1}{z_3} - \frac{1}{f_2}\right)(u^2 + v^2)\right] \times \\ \exp\left\{-jk\left[u\frac{t}{z_3} + v\frac{w}{z_3}\right]\right\} \times \\ h_1(u - \xi, v - \eta)dudv \end{array}\right|^2 \quad (10)$$

We obtain the following symmetry between object and sensor points for a main lens system with $h_1(u,v)=h_1(-u,-v)$ and a microlens system with $P_2(u,v)=P_2(-u,-v)$:

$$\mathcal{P}(t, w, -\xi, -\eta) = \left|\begin{array}{c} \int\int P_2(u, v) \times \exp\left[\frac{jk}{2}\left(\frac{1}{z_2} + \frac{1}{z_3} - \frac{1}{f_2}\right)(u^2 + v^2)\right] \times \\ \exp\left\{-jk\left[u\frac{t}{z_3} + v\frac{w}{z_3}\right]\right\} \times \\ h_1(u + \xi, v + \eta)dudv \end{array}\right|^2$$

$$= \left|\begin{array}{c} \int\int P_2(-u, -v) \times \exp\left[\frac{jk}{2}\left(\frac{1}{z_2} + \frac{1}{z_3} - \frac{1}{f_2}\right)(u^2 + v^2)\right] \times \\ \exp\left\{-jk\left[u\frac{-t}{z_3} + v\frac{-w}{z_3}\right]\right\} \times \\ h_1(-u + \xi, -v + \eta)dudv \end{array}\right|^2$$

$$= \left|\begin{array}{c} \int\int P_2(u, v) \times \exp\left[\frac{jk}{2}\left(\frac{1}{z_2} + \frac{1}{z_3} - \frac{1}{f_2}\right)(u^2 + v^2)\right] \times \\ \exp\left\{-jk\left[u\frac{-t}{z_3} + v\frac{-w}{z_3}\right]\right\} \times \\ h_1(u - \xi, v - \eta)dudv \end{array}\right|^2$$

$$= \mathcal{P}(-t, -w, \xi, \eta) \quad (11)$$

For the configuration that the microlens system focuses an image of the pupil onto the sensor plane $$\left(\frac{1}{z_2} + \frac{1}{z_3} - \frac{1}{f_2} = 0\right),$$

the PIF function reduces to $$\mathcal{P}(t, w, \xi, \eta) = \left|\int\int P_2(u, v) \times \exp\left\{-jk\left[u\frac{t}{z_3} + v\frac{w}{z_3}\right]\right\} \times h_1(u - \xi, v - \eta)dudv\right|^2 \quad (12)$$

In the case that the main lens is radially symmetric, the function $h_1$ is radially symmetric and real-valued (since it is the Fourier transform of a radially symmetric function $\mathcal{F}(f(r))=2\pi\int f(r)rJ_0(\rho r)dr$, where $J_0$ is the zero-order Bessel function).

Therefore, the PIF function itself is the Fourier transform of a real function, i.e.

$$\mathcal{P}(t, w, \xi, \eta) = \left|\mathcal{F}(P_2(u, v)h_1(u - \xi, v - \eta))\left[\frac{t}{z_3}, \frac{w}{z_3}\right]\right|^2 \quad (13)$$

$$= \left|\mathcal{F}^*(P_2(u, v)h_1(u - \xi, v - \eta))\left[\frac{-t}{z_3}, \frac{-w}{z_3}\right]\right|^2$$

$$= \mathcal{P}(-t, -w, \xi, \eta)$$

As a result we obtain the following symmetry relationship for radially symmetric lens systems and a focused microlens system:

$$\mathcal{P}(t,w,\xi,\eta) = \mathcal{P}(t,w,-\xi,-\eta) = \mathcal{P}(-t,-w,\xi,\eta) = \mathcal{P}(-t,-w,-\xi,-\eta). \quad (14)$$

Linear System Model for Image Formation

Discrete Image Formation Via Linear Model with Transfer Matrix.

For given sampling intervals $\Delta p$, $\Delta q$ at the sensor, we can define the discretized version of the PIF function P as the function $\hat{\mathcal{P}}:\mathbb{Z}^4 \to \mathbb{R}$ with $$\hat{\mathcal{P}}(p,q,r,l) = \mathcal{P}(p\Delta p, q\Delta q, r\Delta r, l\Delta l) \quad (15)$$

that describes the intensity value of the response of a point source located at $(r\Delta r, l\Delta l)$ at sensor location $(p\Delta p, q\Delta q)$.

Under the assumption of a finite number of lenslets, the function $\hat{\mathcal{P}}(p,q,r_0,l_0)$ for a fixed object location $(r_0,l_0)$ is a linear function which can be represented by a response matrix $B_{r_0,l_0}$ with entries that are the values $\hat{\mathcal{P}}(p,q,r_0,l_0)$. For each object location, we obtain a different response matrix. By reformating each matrix $B_{r,l}$ into a column vector of a new matrix P, we can define the discrete model of the image formation by $$y = P \cdot x, \quad (16)$$

where x are the intensities of samples in the object region $[-M/2\cdot\Delta r, M/2\cdot\Delta r]\times[-N/2\cdot\Delta l, N/2\cdot\Delta l]$ vectorized into a vector in $\mathbb{R}^{(M+1)\cdot(N+1)}$, y are the intensities at the sensor plane locations in $[-T/2 \cdot \Delta p, T/2 \cdot \Delta p] \times [-W/2 \cdot \Delta q, W/2 \cdot \Delta q]$ vectorized into a vector in $\mathbb{R}^{(T+1) \cdot (W+1)}$, and P being the (M+1)(N+1)×(T+1)(W+1) matrix that contains in each row the values of the vectorized optical response at sensor locations for a specific object location.

Symmetry Properties of the PIF Matrix.

Using the symmetry properties P from Eq. (14), we derive the following symmetry of P, $$P = PJ_\mu, \text{ and } P = J_\nu P \tag{17}$$

where $J_m \in \mathbb{R}^{m \times m}$ and $J_n \in \mathbb{R}^{n \times n}$ are counterdiagonal matrices ($\mu = (M+1)(N+1)$, $v = X+1Y+1$ (M×N are the sensor pixel dimensions, X×Y are the object locations dimensions). A counterdiagonal matrix is a matrix that is 1 on the counter diagonal and zero everywhere else. Therefore, P is a special case of a centrosymmetric matrix. The following is a short proof for the symmetry properties in Eq. (17).

Proof.

Without loss of generality, we consider the on-axis lenslet, i.e. $\mu = v = 0$. The mapping between object and sensor coordinates for a given object location (r,l) in its vectorized form is denoted by $$b_{p,q}[r, l] = vec\left(\hat{P}\left(-\frac{T}{2} + p, -\frac{w}{2} + q, r, l\right)\right) \tag{18}$$

for $p \in [0,T]$, $q \in [0,W]$, $r \in [-X/2, X/2]$, $l \in [-Y/2, Y/2]$ and $b_{p,q}[r, l]$ being of dimension $(W+1)(T+1)$. The index k of an entry $b_k$ of the vector $b_{p,q}[r,l]$ is expressed as $k = (W+1)p+q$ due to the row-wise placement of vectorized system responses. By replacing p with (T-p) and q with (W-q), we obtain for the entry $b_{\tilde{k}}$ of the vector $b_{p,q}[r,l]$ with $\tilde{k} = (W+1)(T-p)+W-q$ with the sensor symmetry characteristic from Eq. (14)

$$b_{\tilde{k}} = b_{(W+1)(T-p)+(W-q)} = b_{WT+W+T-((W+1)p+q)} = b_{(W+1)(T+1)-1-k} \tag{19}$$

As a consequence, we obtain the flip symmetry of the vector $b_{p,q}[r,l]$, expressed as $$b[r,l] = J \cdot b[r,l] \tag{20}$$

where J is a counterdiagonal matrix of dimension $(W+1)(T+1)$. Consequently, we obtain the following flip/mirror symmetry across the vertical and horizontal axis of P.

$$P = J_m P \text{ with } m = (W+1)(T+1). \tag{21}$$

With a similar argument we obtain the symmetry $$P = PJ_n \text{ with } n = (X+1)(Y+1). \tag{22}$$

using the property from Eq. (14).

Now we analyze the reconstruction of an object from sensor data, where the reconstruction is performed through the pseudoinverse of the PIF matrix. Given the singular value decomposition of $P = U\Sigma V^*$, the centrosymmetric property of P results in $P = J_\mu P J_v = J_\mu J \Sigma V^* J_v = U\Sigma V^*$.

The pseudo inverse of P is given by $$P^+ = V\Sigma^+ U^* \tag{23}$$

with the property that the pseudo inverse of a centrosymmetric matrix is centrosymmetric, i.e. $P^+ = JP^+J$. The reconstruction of an object vector x from sensor data y using the pseudo inverse is given by $$\hat{x} = P^+ y \tag{24}$$

The reconstruction vector $\hat{x}$ has the following symmetry property given the symmetric properties of P from Eq. (17).

$$J_\nu \hat{x} = J_\nu P^+ y = J_\nu P^+ J_\mu P x = P^+ y = \hat{x} \tag{25}$$

That means for a given not necessarily symmetric object x we obtain a symmetric reconstruction $\hat{x}$.

P is Special Centrosymmetric Matrix.

In this section we assume the matrix P to be a square m×m matrix. From Eqs. (21)-(22), we obtain the following form.

$$P = \begin{pmatrix} B & BJ \\ JB & JBJ \end{pmatrix} \tag{26}$$

Where J is a m × m counter diagonal matrix, which is a special case of a centrosymmetric matrix. Any centrosymmetric matrix A can be written as $$A = \begin{pmatrix} B & JCJ \\ C & JBJ \end{pmatrix} \tag{27}$$

Setting C=JB, the matrix P satisfies this condition.

We show now that the rank of the P is equal to the rank of B. We know that a centrosymmetrix matrix A is orthogonal similar to a block diagonal matrix $$\begin{pmatrix} B - JC & 0 \\ 0 & B + JC \end{pmatrix}$$

with transformation matrix $$Q = \begin{pmatrix} I & I \\ -J & J \end{pmatrix} \left(\text{i.e. } Q^T A Q = \begin{pmatrix} B - JC & 0 \\ 0 & B + JC \end{pmatrix}\right).$$

That means P is orthogonal similar to $$\begin{pmatrix} 0 & 0 \\ 0 & 2B \end{pmatrix}.$$

As a consequence, me rank of P is equal to the rank of B.

Now we show the block-diagonal structure of the matrix $U^T V$. Let P be expressed by the singular value decomposition $P = U\Sigma V^T$ for orthogonal matrices U, V and diagonal matrix $\Sigma$. Since P is orthogonal similar to $$\begin{pmatrix} 0 & 0 \\ 0 & 2B \end{pmatrix},$$

the rank of P is equal to the rank of B. That means $$\Sigma = \begin{pmatrix} \Sigma_1 & 0 \\ 0 & 0 \end{pmatrix}$$

with $\Sigma_1$ being a diagonal matrix of rank ≤m/2. We now define the singular value decomposition of B as $$B = U_B \Sigma_B V_B \tag{28}$$

Now we can construct the matrices U, V such that they will provide a suitable SVD for P. Let $$U = \begin{pmatrix} U_1 & U_2 \\ JU_1 & -JU_2 \end{pmatrix}, \text{ and } V = \begin{pmatrix} V_1 & V_2 \\ JV_1 & -JV_2 \end{pmatrix}. \quad (29)$$

Then the matrix $$C = U \begin{pmatrix} \Sigma_B & 0 \\ 0 & 0 \end{pmatrix} V^T = \begin{pmatrix} U_1 \Sigma_B V_1^T & U_1 \Sigma_B V_1^T J \\ JU_1 \Sigma_B V_1^T & JU_1 \Sigma_B V_1^T J \end{pmatrix}$$

has the property CJ=C, JC=C. If we set $U_1=U_B$, and $V_1=V_B$, then we obtain $$P = C = \begin{pmatrix} B & BJ \\ JB & JBJ \end{pmatrix}.$$

The matrices U and V are orthogonal if $U^TU=V^TV=UU^T=VV^T=I_m$. With $$U^TU = \begin{pmatrix} U_1^TU_1 & 0 \\ 0 & U_2^TU_2 \end{pmatrix}, V^TV = \begin{pmatrix} V_1^TV_1 & 0 \\ 0 & V_2^TV_2 \end{pmatrix},$$

$$\text{then } UU^T = \begin{pmatrix} U_1U_1^T + U_2U_2^T & U_1U_1^TJ - U_2U_2^TJ \\ JU_1U_1^T - JU_2U_2^T & JU_1U_1^TJ + JU_2U_2^TJ \end{pmatrix},$$

$$\text{and } VV^T = \begin{pmatrix} V_1V_1^T + V_2V_2^T & V_1V_1^TJ - V_2V_2^TJ \\ JV_1V_1^T - JV_2V_2^T & JV_1V_1^TJ + JV_2V_2^TJ \end{pmatrix},$$

we obtain orthogonality of the matrices U and V if $U_1$, $U_2$, $V_1$, $V_2$ are orthogonal matrices. Since $U_1=U_B$, $V_1=V_B$ we have orthogonality of $U_1$, $V_1$. The matrices $U_2$, $V_2$ can be chosen as any orthogonal matrices.

The matrix $U^TV$ then results in $$U^TV = 2 \begin{pmatrix} U_1^TV_1 & U_1^TV_2 - U_1^TJJV_2 \\ U_2^TV_1 - U_2^TJJV_1 & U_2^TV_2 \end{pmatrix} = \begin{pmatrix} U_1^TV_1 & 0 \\ 0 & U_2^TV_2 \end{pmatrix} \quad (30)$$

(utilizing the properties JJ=I and $J^T$=J) which shows its block-diagonal structure.

What is claimed is:

1. A method implemented on a computer system comprising a programmable processor and memory, the method for producing an estimate $\hat{A}$ of a system transfer matrix A for a linear system, wherein the linear system is characterized by y=Ax+e, where x is an input vector, e is a noise vector and y is the output vector resulting from input vector x, the method comprising:
    selecting a set of calibration inputs $X_{cal}=[x_1, \ldots x_m]$ where each of the $x_m$ is an input vector that is a calibration pattern;
    applying the calibration inputs $X_{cal}$ to the linear system;
    observing the calibration outputs $Y_{cal}$ resulting from the calibration inputs $X_{cal}$ according to Y=AX+E, where $Y_{cal}=[y_1, \ldots, y_m]$ where each of the $y_m$ is an output vector resulting from the corresponding input calibration pattern $x_m$, and E=$[e_1, \ldots, e_m]$ where each of the $e_m$ is a noise vector;
    identifying, by the computer system, a subspace of A, assuming that a column span of A equals a row span of A;
    calculating, by the computer system, an estimate $\hat{A}$ within the subspace of A, the estimate $\hat{A}$ calculated from the calibration outputs $Y_{cal}$ and calibration inputs $X_{cal}$ and subject to a constraint that a row span of the estimate $\hat{A}$ equals a column span of the estimate $\hat{A}$;
    observing outputs $Y_1$ produced by the linear system; and
    based on solving an inverse problem for the calculated estimate $\hat{A}$, estimating, by the computer system, corresponding inputs $X_1$ that produced the outputs $Y_1$.

2. The computer-implemented method of claim 1 wherein the linear system is a plenoptic imaging system, the system transfer matrix A is a pupil image function (PIF) matrix for the plenoptic imaging system, the input x is an object to be imaged by the plenoptic imaging system, the output y is a plenoptic image resulting from object x, the calibration inputs X are calibration patterns, and the outputs Y are plenoptic images resulting from the calibration patterns X.

3. The computer-implemented method of claim 1 wherein identifying the subspace of A comprises performing a singular value decomposition (SVD) of Y.

4. The computer-implemented method of claim 3 wherein SVD(Y)=(WΛZ) and estimating $\hat{A}$ within the subspace is given by $\hat{A}=Y(\hat{V}^TX)^\dagger \hat{V}^T$, where $\hat{V}=W(:, 1:\hat{k})$ and $\hat{k}$ is greater than or equal to the rank of A.

5. The computer-implemented method of claim 1 wherein the calibration inputs X comprise random calibration inputs.

6. The computer-implemented method of claim 5 wherein the calibration inputs X is populated with i.i.d. Gaussian entries ~N(0,1/m) where N( ) is the normal distribution and m is the number of calibration inputs.

7. The computer-implemented method of claim 5 wherein the calibration inputs X is populated with i.i.d symmetric Bernoulli entries taking ±sqrt(1/m) with probability ½.

8. The computer-implemented method of claim 5 wherein the calibration inputs X is populated with i.i.d. random variables taking ±sqrt(3/m) with probability ⅙ and zero with probability ⅔.

9. The computer-implemented method of claim 5 wherein the calibration inputs X is populated with entries that satisfy the Restricted Isometry Property (RIP) for matrices and/or vectors.

10. The computer-implemented method of claim 1 wherein $\hat{A}$ is an N×N matrix, and the number of calibration inputs in X is less than N/4.

11. The computer-implemented method of claim 1 wherein $\hat{A}$ is an N×N matrix, and the number of calibration inputs in X grows sub-linearly with N.

12. The computer-implemented method of claim 1 wherein calculating the estimate $\hat{A}$ assumes that A has four-quadrant symmetry.

13. The computer-implemented method of claim 1 wherein calculating the estimate $\hat{A}$ assumes that A has low rank.

14. The computer-implemented method of claim 1 wherein:
    the calibration inputs X is populated with entries that satisfy the Restricted Isometry Property (RIP) for matrices; and
    calculating the estimate $\hat{A}$ comprises:
    performing a singular value decomposition (SVD) of Y where SVD(Y)=(WΛZ); and calculating $\hat{A}=Y(\hat{V}^T X)^\dagger \hat{V}^T$, where $\hat{V}=W(:,1:\hat{k})$ and $\hat{k}$ is greater than or equal to the rank of A.

15. A non-transitory computer-readable medium containing instructions that, when loaded into memory and executed by a processor, cause execution of a method for producing an estimate $\hat{A}$ of a system transfer matrix A for a linear system, wherein the linear system is characterized by y=Ax+e, where x is an input vector, e is a noise vector and y is the output vector resulting from input vector x, the method comprising:

selecting a set of calibration inputs $X_{cal}=[x_1, \ldots, x_m]$ where each of the $x_m$ is an input vector that is a calibration pattern;

applying the calibration inputs $X_{cal}$ to the linear system;

observing the calibration outputs $Y_{cal}$ resulting from the calibration inputs $X_{cal}$ according to Y=AX+E, where $Y_{cal}=[y_1, \ldots, y_m]$ where each of the $y_m$ is an output vector resulting from the corresponding input calibration pattern $x_m$, and $E=[e_1, \ldots, e_m]$ where each of the $e_m$ is a noise vector;

identifying, by the processor executing the instructions, a subspace of A, assuming that a column span of A equals a row span of A;

calculating, by the processor executing the instructions, an estimate $\hat{A}$ within the subspace of A, the estimate $\hat{A}$ calculated from the calibration outputs $Y_{cal}$ and calibration inputs $X_{cal}$ and subject to a constraint that a row span of the estimate $\hat{A}$ equals a column span of the estimate $\hat{A}$;

observing outputs $Y_1$ produced by the linear system; and based on solving an inverse problem for the calculated estimate $\hat{A}$, estimating, by the processor executing the instructions, corresponding inputs $X_1$ that produced the outputs $Y_1$.

16. The non-transitory computer-readable medium of claim 15 wherein:

identifying the subspace of A comprises performing a singular value decomposition (SVD) of Y according to SVD(Y)=(WΛZ); and estimating $\hat{A}$ within the subspace is given by $\hat{A}=Y(\hat{V}^T X)^\dagger \hat{V}^T$, where $\hat{V}=W(:,1:\hat{k})$ and $\hat{k}$ is greater than or equal to the rank of A.

17. The non-transitory computer-readable medium of claim 15 wherein the calibration inputs X is populated with random entries that satisfy the Restricted Isometry Property (RIP) for matrices.

18. A system for producing an estimate $\hat{A}$ of a system transfer matrix A for a linear system, wherein the linear system is characterized by y=Ax+e, where x is an input vector, e is a noise vector and y is the output vector resulting from input vector x, the system comprising:

a computer system comprising a memory and a processor;

a selection module that selects a set of calibration inputs $X_{cal}[x_1, \ldots, x_m]$ where each of the $x_m$ is an input vector that is a calibration pattern;

an observation module that captures the calibration outputs $Y_{cal}$ resulting from the application of the calibration inputs $X_{cal}$ to the linear system according to Y=AX+E, where $Y_{cal}=[y_1, \ldots, y_m]$ where each of the is an output vector resulting from the corresponding input calibration pattern $x_m$, and $E=[e_1, \ldots, e_m]$ where each of the $e_m$ is a noise vector wherein the processor executes instruction stored in the memory, that identifies a subspace of A, assuming that a column span of A equals a row span of A; and that further calculates an estimate A within the subspace of A, the estimate $\hat{A}$ calculated from the calibration outputs $Y_{cal}$ and calibration inputs $X_{cal}$ and subject to a constraint that a row span of the estimate $\hat{A}$ equals a column span of the estimate $\hat{A}$;

the observation module further capturing outputs $Y_1$ produced by the linear system; and the processor executing further instruction stored in the memory, for solving an inverse problem for the calculated estimate $\hat{A}$ to estimate corresponding inputs $X_1$ that produced the outputs $Y_1$.

19. The system of claim 18 wherein calculating the estimate A comprises the processor executing further instruction stored in the memory for:

identifying the subspace of A comprises performing a singular value decomposition (SVD) of Y according to SVD(Y)=(WΛZ), and estimating $\hat{A}$ within the subspace is given by $\hat{A}=Y(\hat{V}^T X)^\dagger \hat{V}^T$, where $\hat{V}=W(:,1:\hat{k})$ and $\hat{k}$ is greater than or equal to the rank of A.

* * * * *